Dec. 15, 1925.

C. W. KINCAID 1,565,467

BEARING

Filed Oct. 24, 1922

WITNESSES:

INVENTOR
Charles W. Kincaid.
BY
ATTORNEY

Patented Dec. 15, 1925.

1,565,467

UNITED STATES PATENT OFFICE.

CHARLES W. KINCAID, OF CARRICK, PENNSYLVANIA, ASSIGNOR TO WESTINGHOUSE ELECTRIC & MANUFACTURING COMPANY, A CORPORATION OF PENNSYLVANIA.

BEARING.

Application filed October 24, 1922. Serial No. 596,588.

*To all whom it may concern:*

Be it known that I, CHARLES W. KINCAID, a citizen of the United States, and a resident of Carrick, in the county of Allegheny and State of Pennsylvania, have invented a new and useful Improvement in Bearings, of which the following is a specification.

My invention relates to improvement in dowels and it has particular relation to methods of and means for securing a dowel in an opening in a bearing housing for retaining the bearing in position.

The principal object of my invention is to provide a simple and practical dowel means for securing a bearing in a housing by a pin of definite or standard length, regardless of the depth of the opening in the housing receiving the pin, thus effecting a considerable saving of time and labor in assembling bearings within their housings.

Figure 1:
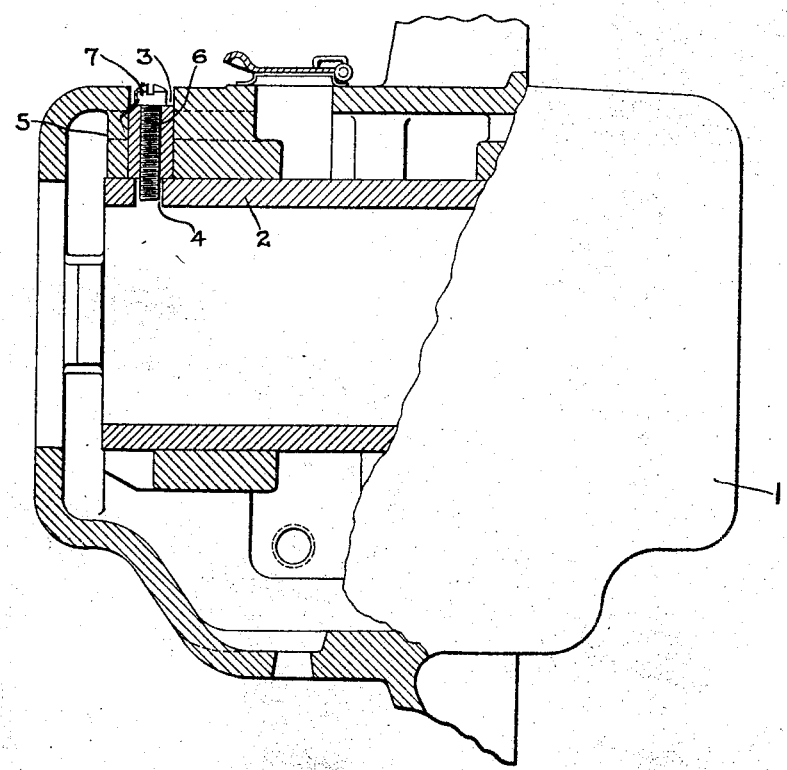
Figure 2:
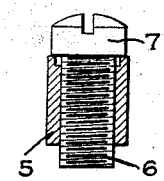

In the accompanying drawing:

Figure 1 is a fragmentary longitudinal and partially sectional view of a bearing provided with my improved pin structure and Fig. 2 is a vertical sectional view of the pin structure.

In the drawing is shown a bearing housing 1 having an annular bearing 2 fitted therein. The housing is provided with a circular opening 3 at a suitable place in its wall and the bearing with a like opening 4 of smaller diameter registering with the opening 3 of the housing.

A sleeve 5 of proper diameter and of a definite or fixed length, suitable for a complete line of housings of various sizes, is forcibly fitted into the opening 3 of the housing until its inner end engages the peripheral surface of the bearing 2 about the opening 3. The sleeve 5, when forced into the opening 3 to the bottom thereof, is then, at all times, a definite distance from the bearing, the upper end thereof forming a shoulder portion in the opening similar to that of a counter-bore. The sleeve is internally threaded to receive the threaded dowel pin 6, which is also of a definite length, for all requirements, and is provided with a shouldered head 7. The pin head is of a diameter a little less than that of the outer diameter of the sleeve and, in practice, seats upon the end of the sleeve, in shoulder-to-shoulder relation, the end of the pin projecting below the lower end of the sleeve and into the bearing opening 3 a definite distance sufficient to prevent any movement of the bearing.

By providing a single size of sleeve 5 for bearing housings of all kinds, and by providing a co-acting dowel pin 6 of definite length, it is evident that, when the sleeve is forced home in the opening of the housing, even though the holes, vary in depth, there will always be a fixed length of pin projecting from the end of the sleeve to serve as a locking means for the bearing, notwithstanding variations in the casting of the housing.

By withdrawing the screw a sufficient distance, the bearing may readily be removed.

Modifications as to detail and arrangement may be made without departing from the spirit of my invention. I desire therefore, that the disclosed embodiment shall be regarded as illustrative only and that the appended claims shall be accorded the broadest construction consistent with the prior art.

I claim as my invention:

1. The combination of a housing having an opening therein, an annular bearing fitted in the housing and provided with an opening registering with that of the housing, a sleeve of predetermined length fitted into the housing opening and having one end in engagement with said bearing, said sleeve forming a shoulder in said opening, and a shouldered pin of predetermined length fitted shoulder-to-shoulder into said sleeve and projecting into the bearing opening.

2. The combination of a housing having an opening therein, an annular bearing fitted in the housing and provided with an opening registering with that of the housing, a sleeve threaded internally and fitted into the housing opening in a predetermined position and forming a shoulder therein, and a shouldered screw pin of predetermined length fitted shoulder-to-shoulder into said sleeve and projecting into the bearing opening.

3. The method of securing headed pins of uniform length in walls of non-uniform thickness, in such manner that the pins project a uniform distance beyond a surface of said walls, comprising the steps of boring holes of uniform diameter through said walls, securing sleeves of uniform length within said holes in such manner that said sleeves have one end flush with said surface, said surface being the wall-side opposite to that from which said sleeves were inserted, and securing said headed pins within said sleeves with the heads of the pins in engagement with the other ends of the sleeves.

4. The combination with a wall of any suitable thickness having an opening therethrough, of means for securing a pin in said opening in such manner that the end of the pin projects a predetermined distance from the far side of the wall, said means comprising a sleeve secured in said opening with one end flush with said far side of the wall and means for securing said pin in said sleeve in such manner that the length of the projecting end of the pin is determined by the length of the sleeve regardless of the thickness of the wall.

5. The method of removably securing threaded headed pins of uniform length in walls of non-uniform thickness in such manner that the pins project a uniform distance beyond a surface of said walls, comprising the steps of boring holes of uniform diameter through said walls, securing sleeves of uniform length within said holes in such manner that said sleeves have one end flush with said surface, said surface being the wall-side opposite to that from which said sleeves were inserted, and threading said headed pins into said sleeves until the heads of the pins are in engagement with the other ends of the sleeves.

6. The combination with a wall of any suitable thickness having an opening therethrough, of means for securing a threaded headed pin in said opening in such manner that the end of the pin projects a predetermined distance from the far side of the wall, said means comprising a sleeve secured in said opening with one end flush with said far side of the wall, said sleeve having its internal bore threaded to receive said pin, whereby the length of the projecting end of the pin is determined by the length of the sleeve, regardless of the thickness of the wall.

7. The method of securing headed pins of uniform length in walls of non-uniform thickness in such manner that the pins project a uniform distance beyond a surface of said walls, comprising the steps of boring holes of uniform diameter through said walls, forcibly driving sleeves of uniform length within said holes, from the wall-side opposite to said surface, until the one end thereof is flush with said surface, and securing said headed pins within said sleeves with the heads thereof in engagement with the other ends of the sleeves.

8. The combination with a plurality of parts, of dowel pins of uniform length for maintaining said parts in juxta-position, one of the parts being provided with a wall having a perforation, another juxta-positioned part having a smaller opening registering therewith, the perforated walls being of non-uniform thickness, sleeves of uniform length secured in said perforations in engagement with the juxta-positioned parts, respectively, and means for securing said pins in said sleeves, respectively, whereby the lengths of the ends of the pins projecting into the smaller openings of the juxta-positioned parts shall be determined by the lengths of the sleeves regardless of the thickness of the perforated walls.

In testimony whereof, I have hereunto subscribed my name this 13th day of October, 1922.

CHARLES W. KINCAID.